United States Patent [19]

Forsyth

[11] 4,408,646
[45] Oct. 11, 1983

[54] WHEELED VEHICLE SUPPORT APPARATUS

[76] Inventor: Robert W. Forsyth, 1267 W. 9th St., Upland, Calif. 91786

[21] Appl. No.: 317,559

[22] Filed: Nov. 2, 1981

[51] Int. Cl.³ .............................................. B60C 27/00
[52] U.S. Cl. .................................. 152/179; 152/185.1; 152/187; 152/191; 152/225 C; 152/228; 172/387; 305/19; 305/34; 305/58 R; 305/58 PC
[58] Field of Search ........... 152/179, 182, 191, 225 R, 152/225 C, 226–230, 171, 178, 185.1, 187, 188; 56/322; 172/542; 305/19, 34, 56, 57, 58 R, 58 PC

[56] References Cited

U.S. PATENT DOCUMENTS 1,077,129 10/1913 Douglas ........................... 152/191 X
1,373,985 4/1921 Soldani ................................. 152/182
2,008,210 7/1935 Hipkins ............................. 305/19 X Primary Examiner—William A. Powell
Assistant Examiner—Thomas Bokan
Attorney, Agent, or Firm—Roger A. Marrs

[57] ABSTRACT

A wheeled vehicle flotation augmentation device is disclosed herein having at least elongated segments releasably connected together in a continuous and endless series of track block guides so as to form a circular tread about the periphery of a single wheel of the vehicle. The plurality of track block guides in the series are hingably coupled together and the adjacent ends of each segment of track block guides are joined by releasable pins. Each track block guide includes a flat base having outwardly projecting and spaced apart side horns which are separated by the wheel of the vehicle. The terminating tips of the side horns are rounded to aid in projecting a load bearing track block beyond full tire contact and so provide increased ground contact length or aspect ratio in soft-soil or snow environments.

6 Claims, 3 Drawing Figures

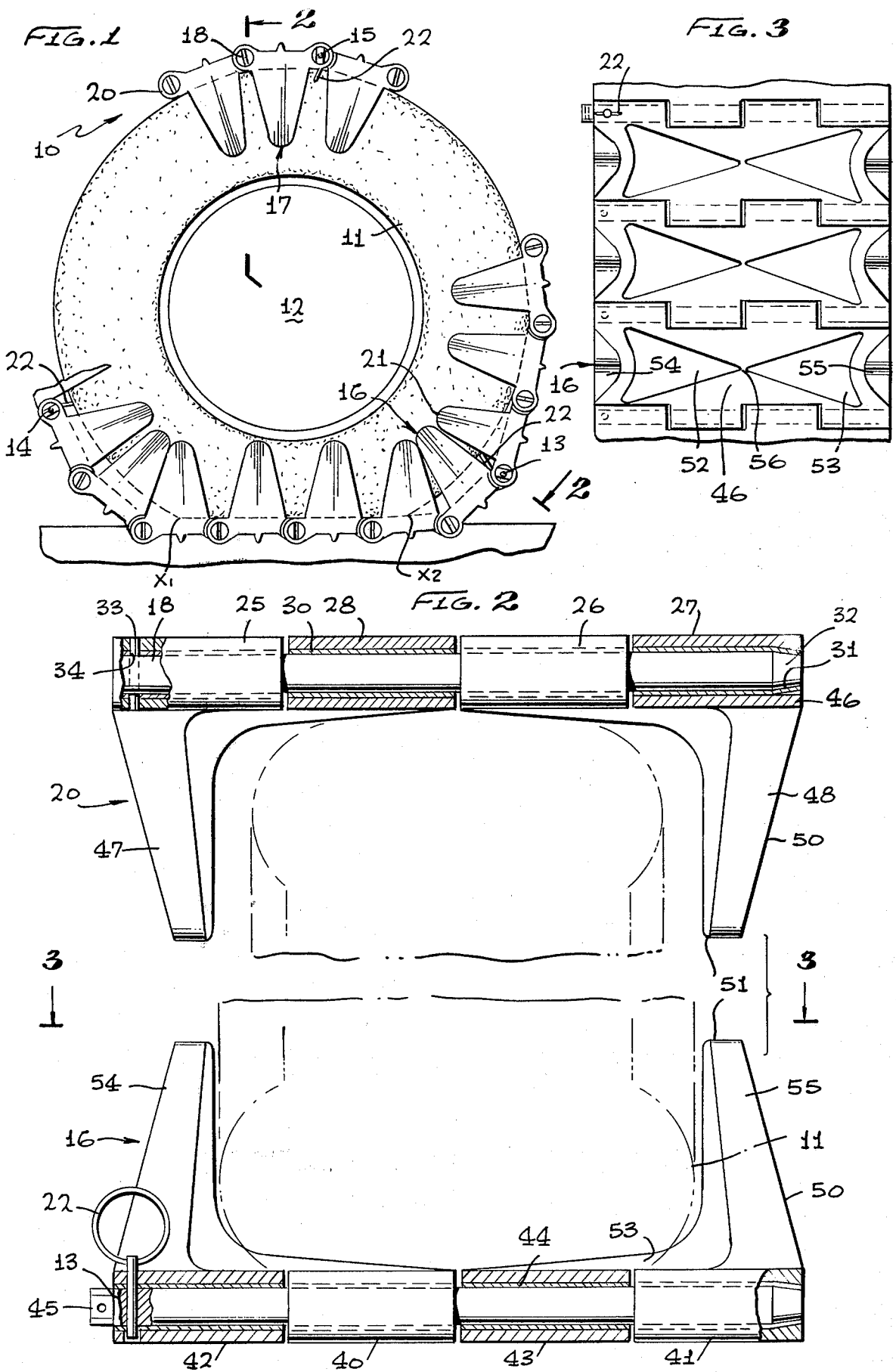

WHEELED VEHICLE SUPPORT APPARATUS

BACKGROUND OF THE INVENTION

1. Field of the Invention

This invention relates to wheeled vehicle support devices and more particularly to a novel apparatus by which a single wheel ground contact area can be increased employing a flotation augmentation means.

2. Brief Description of the Prior Art

Numerous attempts have been made to improve the soft-soil and snow performance of wheeled vehicles. In the case of conventional wheeled vehicle designs, for example, automobiles, trucks, and farm tractors, emphasis has been placed on the grouser effect of chains and the like to improve thrust by a soil shearing action. While this approach has enjoyed a measure of success with powered driving wheels, unpowered wheels on trailers, aircraft, farm implements, and construction equipment have represented a compromise in terms of tire and wheel design. On the one hand, the desirable goal of a relatively high-pressure tire for operation on improved surfaces such as paved roads and airfields conflicts with tire characteristics desired, on the other hand, in soft soils and snow. In the latter conditions, increased ground contact area and greater flotation are essential. It is a well known principle in soil mechanics that increasing the lengthwise dimension of the ground contact area is significantly more effective mobility-wise than increasing the width of said contact area.

The compromises afforded the designer up until now have, however, been limited, and in applications demanding a minimum volume running gear, such as an aircraft landing gear, the high-pressure tire, minimum envelope approach has prevailed. This situation of course, has restricted high-performance aircraft, for example, to ground operations on improved surfaces. Likewise, the characteristic stress concentrations on these improved surfaces dictates the depth and composition of the subgrade as well as the thickness of the pavement and base.

If considered in a strict military context, the limited ground mobility, or limited ability to traverse anything short of an improved paved surface represents a serious limitation for today's military aircraft. Additionally, the vulnerability of the high pressure, heavily loaded tire to damage or failure from rocks and debris argues in favor of some form of protective barrier.

Therefore, a longstanding need has existed especially related to aircraft, to provide a flotation device for single and dual wheels to increase ground contact area, ideally, in a lengthwise manner, and also to serve as a protective barrier from rocks, debris, and the like.

SUMMARY OF THE INVENTION

Accordingly, the above problems and shortcomings are obviated by the present invention which provides for a substantial increase in ground contact area by means of a novel apparatus having a unique track geometry. The additional benefit of tire protection is gained by the enveloping characteristics of the tracks with respect to the tire tread and side walls.

In one form, the invention includes at least three elongated track segments having adjacent ends releasably joined together in end-to-end relationship so as to define a circular track substantially encasing the tread and sidewalls of a tire movably carried on a wheeled vehicle. Each track segment includes a plurality of identical block members wherein each of such members is provided with a base and integrally formed side guide horns extending in fixed spaced apart relationship. Hinge means movably join respective block members together and the configuration of each of said track members and side guide horns is such that means are defined for increasing ground contact area, particularly the length of said area, as compared with the ground contact area of the wheeled tire per se.

Therefore, it is among the primary objects of this invention to provide a novel auxiliary flotation track for single or dual wheels to facilitate operation over unimproved terrain, soft-soil and snow.

Another object of the present invention is to provide a protective barrier between a relatively high-pressure pneumatic tire and sharp rocks and other debris likely to be encountered when operating over unimproved surfaces.

Another object of the present invention is to provide for rapid installation and removal of an auxiliary flotation track under field conditions.

Still a further object of this invention resides in the novel method for extending track contact length by utilizing guide tip means to project a load bearing track block beyond full tire contact.

Yet another object of the present invention is to provide a novel track apparatus for the tires of a wheeled vehicle adapted to accommodate lateral forces induced by turning, obstacle negotiation, and side-slope operation as well as increasing ground contact area.

BRIEF DESCRIPTION OF THE DRAWINGS

The features of the present invention which are believed novel are set forth in the appended claims. The present invention, both as to its organization and manner of operation, together with further objects and advantages thereof, may best be understood by reference to the following description, taken in connection with the accompanying drawings in which:

FIG. 1 is a side-elevational view illustrating the novel tire support or flotation track apparatus of the present invention for increasing the effective ground contact length;

FIG. 2 is an enlarged transverse cross sectional view of the apparatus shown in FIG. 1 as taken in the direction of arrows 2—2 thereof; and FIG. 3 is a fragmentary plan view of the present invention illustrating the internal convex cone-shaped termination of a typical guide horn as taken in the direction of arrows 3—3 of FIG. 2.

DESCRIPTION OF THE PREFERRED EMBODIMENT

Referring to FIG. 1, the novel flotation track apparatus of the present invention is illustrated in the general direction of arrow 10 and is shown in connection with a conventional, high-pressure, tire and wheel combination. The tire is identified by numeral 11 and is illustrated as being mounted on a wheel such as is employed in aircraft or the like and identified by numeral 12. Typical vehicles employing this type of tire and wheel combination that benefit from the added utility of the auxiliary flotation track 10 include trailers, semi-trailers and farm implements. Such crops as lettuce, celery and rice require implements and harvesting equipment with high-flotation running gear. Also, the additional utility of employing a trailer, for example, designed for operation over improved highways in a field or paddy for crop gathering would result in a considerable savings when the subject invention is employed. Likewise, oil and mineral exploration operations benefit from the present invention in that road-mobile equipment could be employed in remote areas requiring high-flotation running gear and tire protection.

Potential military applications are numerous and include all types of aircraft with wheeled landing gear as well as combat and tactical ground vehicles. With the flotation track apparatus installed after landing, an airplane or helicopter may be towed or taxied over unimproved terrain for concealment or dispersal. Conversely, the aircraft may be moved over random routes for access to runways, highways or other suitable surfaces for take-off. Additional possibilities include the recovery of disabled aircraft requiring significant reductions in landing gear unit ground pressures.

Referring now in detail to FIG. 1, the flotation track apparatus 10 includes at least three segments which are joined together by a releasable means so that a continuous circular tread is produced over the tire 11. A single segment is illustrated extended between releasable connector pins 13 and 14. A second segment is illustrated between releasable pin 14 and a releasable pin 15. A third segment is established between releasable pin 15 and releasable pin 13. Therefore, it can be seen that a continuous tread is provided which encompasses the tread and sidewall of the tire 11.

Each of the track segments includes a plurality of track block members such as block member 16 associated with releasable connector pin 13 and a track block member 17 associated with the releasable connector pin 15. The plurality of track block members are joined together at their adjacent ends by a hinge means taking the form of a connector pin which is inserted through a bore in the interwoven tangs of the hinge means. A typical connector pin for interconnecting adjacent ends of track block members is identified by numeral 18 and is joining track block member 17 with track block member 20. The track block member 16 is joined to an adjacent track block member 21 by means of a releasable connecting pin 13 which is held in place by a locking pin 22. When it is desired to install the segments onto a tire, or to remove the segments from a tire, the lock pin 22 is pulled so that the connector pin 13 can be withdrawn to disconnect the segments. At this time, the remaining segments can be disengaged from the tire and laid flat on the ground so that the wheel is not encumbered.

Referring now in detail to FIG. 2, it can be seen that the track block member 20 includes a pair of spaced apart tangs 25 and 26. It can also be seen that the track block member 17 includes similar tangs 27 and 28 which are offset from the tangs 25 and 26 so as to be aligned permitting co-axial and co-extensive relationship of a common bore extending between all of the tangs. The bore associated with each of the tangs is provided with a bushing or sleeve and such a bushing is illustrated by numeral 30 with respect to the tang 28 carried on track block member 17. The connector pin 18 is inserted through the bore in close relationship with the bushing or sleeve 30 and a selected end of the bore is reduced as illustrated by numeral 31 so as to serve as a stop once the pin has been properly inserted. Preferably, the corresponding end of the connector pin associated with the stop 31 is tapered to correspond with the reduced diameter of the bore. This end is identified by numeral 32.

The length of the pin 18 is somewhat shorter than the length of the combined bore into which it is inserted so that a retention pin, such as a roll pin identified by numeral 33 may be inserted through a hole in the block 20 and pass through the bore identified by numeral 34 to prevent the connecting pin 18 from dislodging.

Continuing with the detailed description of FIG. 2, it can be seen that the track segment connector pin 13 is inserted into the bore of combined tangs 40 and 41 associated with track block member 16 and tangs 42 and 43 associated with track block member 21. In a similar fashion, the bores are provided with suitable sleeves or bushings such as the bushing 44 associated with tang 43. Also, the end of the segment connector pin 13 is tapered to conform with the reduced bore of the tang 41 so that the pin will bottom-out when properly inserted. The pin 13 includes an outwardly projecting portion 45 having suitable flats provided thereon so that tools such as wrenches or the like may be placed thereon in the event sticking occurs during removal of the connector pin. The connector pin is detachably connected to the assembly by means of locking pin 22 and pull ring arrangement which passes through aligned holes in the tang 42 and the end of the connector pin 13.

It can also be seen that each of the respective track block members is of a U-shaped configuration in end view and that each of the members includes a base 46 and spaced apart side guide horns 47 and 48. Each of the horns includes an exterior surface 50 which slopes from the base 46 inward towards the center of the device. Also, each of the guide horns terminates in a rounded tip 51. By means of the rounded tip 51 and the sloping exterior sides, a configuration is produced and defined which permits the track block members to be rotated with respect to each other as shown in FIG. 1. In FIG. 1, it can be seen that the free rounded ends of the side guide horns are of a lesser dimension than the end of the guide horns which are integrally formed with the respective bases 46. The object of this configuration which may be best determined by reference to FIG. 1, is to cause track block members ($X_1$ and $X_2$) not fully under and in full intimate contact with the tread of the tire to be projected out horizontally to increase track contact area, particularly in a lengthwise manner. The horizontal projection of said track block members occurs because of the interaction of track block members 21, 16, and $X_2$, and the configuration of their side guide horns and the dimensional relationships between the rounded tips of said horns and the centerline of the connector pins (such as 13) joining the track blocks. In further explanation, with the track trained loosely around the tire, as in FIG. 1, track block member 21 pivots on connector pin 13 and the rounded tips of its guide horns impinge on the guide horns of track block member 16. This levering action causes track block member 16 to assume the position shown in FIG. 1, and it, in turn, through the connector pin linking it to track block member $X_2$ and impingement of the tips of its guide horns on the tips of those $X_2$, levers said track block member $X_2$ into the horizontal position shown.

Tracking, or the ability of the flotation track apparatus to provide a smooth path for the wheel tire combination is enhanced by the convexity of the cone-shaped configuration identified by numeral 52 of the guide horn internal contact surface. This surface geometry transitions to the horizontal internal face of the track block and terminates at the center line vertex.

This latter construction is more clearly shown in FIG. 3 wherein it can be seen that each half of the block member includes such a cone-shaped configuration as identified by numeral 52 and 53 associated with track block member 16. The spaced guide horns of member 16 are identified by numerals 54 and 55 and the apex of the cone-shaped configurations are opposing each other at the point identified by numeral 56.

In actual practice, to facilitate quick installation and removal in the field, a typical track assembly is formed from the three identical segments consisting of the plurality of single-pin track block members. The segments are joined with removable pins 13, 14, and 15, at least one of which will be in a convenient position for installation or removal despite the random rotation of the wheel track combination.

The configuration and design of the integral track block guide horns contribute to the unique performance characteristics of the present inventive concept. In addition to the conventional function of accommodating lateral forces induced by turning, obstacle negotiation, and side-slope operations, the guide tips provide the means by which the increased ground contact length or aspect ratio is achieved in soft-soil or snow conditions. Alternatively, a single, centered guide horn positioned to occupy the cavity between a dual wheel arrangement as found on highway trucks, trailers and the like can be configured with the same radiused guide tips and function in the same manner to project a load bearing track block beyond full tire contact.

This feature of the present invention, when combined with the flat lateral design of the track, provides the increased contact area desired. When contrasted to the short elliptical planform of a conventional tire contacting a surface, the lengthwise oriented, rectangular footprint realized with this invention results in a more effective, sinkage resistant pressure distribution. This attribute improves the potential for avoiding local soil failures, and hence, immobilization.

Should it be desired to employ the flotation track in a single or tandem powered wheel application, the convex design of the track block/tire interface contributes to the transmission of driving torque. Likewise, for both unpowered and powered wheel applications, the track block/tire interface geometry contributes to the transmission of braking forces.

While the potential advantages of the present invention have been briefly described, it will be obvious to those skilled in the art that changes or modification thereof to accommodate the dimensional restrictions of wheel housings, chassis frames, and landing gear geometry may be made without departing from this invention in its broader aspects and, therefore, the object of the appended claims is to cover all such changes and modifications as fall within the true spirit and scope of this invention.

What is claimed is:

1. A wheeled vehicle support apparatus comprising:
at least three elongated tread segments; means detachably connecting adjacent ends of said tread segments together to provide a continuous and endless circular tread;
each of said tread segments having a plurality of individual track block members hingably coupled together;
each of said track block members having ground engaging means on its exterior surface and a tire engaging means on its internal contact surface;
each of said track block members is of U-shaped cross section having a flat base with upright spaced apart guide horns; and
each of said track block members includes an internal contact surface configured with a pair of cone-shaped masses having opposing apexes terminating at the center line vertex.

2. The invention as defined in claim 1 including:
release means associated with each of said tread segments for selectively detaching said segments from each other.

3. The invention as defined in claim 2 wherein:
said guide horn free ends terminate in a rounded configuration having a reduced dimension from its dimension joining with said base.

4. The invention as defined in claim 3 wherein:
said rounded free ends of the side guide horns are so configured in radius and are so positioned in relation to the centerline of track block member connection pins that each track block member can act as a lever on an adjacent track block member causing said adjacent track block member to assume a desired orientation.

5. The invention as defined in claim 4 wherein:
said track block members are coupled together by a connector pin and a retention pin releasably couples said connector pin to said track block member base.

6. A wheeled vehicle support apparatus comprising:
at least three elongated tread segments; means detachably connecting adjacent ends of said tread segments together to provide a continuous and endless circular tread;
each of said tread segments having a plurality of individual track block members hingably coupled together;
each of said track block members having ground engaging means on its exterior surface and a tire engaging means on its internal contact surface;
each of said track block members is of inverted T-cross section having a flat base with a single guide horn occupying the void between a dual wheel arrangement; and
each of said track block members includes an internal contact surface configured with a pair of cone-shaped masses having opposing apexes terminating at the center line vertex.

* * * * *

UNITED STATES PATENT AND TRADEMARK OFFICE
CERTIFICATE OF CORRECTION

PATENT NO. : 4,408,646

DATED : October 11, 1983

INVENTOR(S) : Robert W. Forsyth et al.

It is certified that error appears in the above-identified patent and that said Letters Patent is hereby corrected as shown below:

On the title page, Item [76] should read

-- Robert W. Forsyth and John P. Forsyth

1267 W. 9th St.,

Upland, Calif. 91786 --.

Signed and Sealed this

Fifth Day of June 1984

[SEAL]

Attest:

GERALD J. MOSSINGHOFF

Attesting Officer

Commissioner of Patents and Trademarks